(12) United States Patent
Oowaki et al.

(10) Patent No.: US 6,327,654 B1
(45) Date of Patent: Dec. 4, 2001

(54) SEMICONDUCTOR INTEGRATED CIRCUIT FOR CRYPTOGRAPHIC PROCESS AND ENCRYPTION ALGORITHM ALTERNATING METHOD

(75) Inventors: Yukihito Oowaki, Kanagawa; Hiroshige Fujii, Tokyo; Hideo Shimizu, Kanagawa; Takehisa Kato, Kanagawa; Naoki Endo, Tokyo; Atsushi Masuda, Kanagawa; Hiroaki Nishi, Kanagawa; Kazunori Ohuchi, Kanagawa; Masatoshi Sekine, Tokyo, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/151,774

(22) Filed: Sep. 11, 1998

(30) Foreign Application Priority Data

Sep. 12, 1997 (JP) .................................................. 9-249230

(51) Int. Cl.⁷ ..................................................... G06F 11/30
(52) U.S. Cl. ................................. 713/167; 380/28; 380/29
(58) Field of Search ......................... 380/28, 29; 713/167

(56) References Cited

U.S. PATENT DOCUMENTS 5,740,249 * 4/1998 Shimizu et al. ........................ 380/28
5,949,884 * 9/1999 Adams et al. .......................... 380/29
6,031,911 * 2/2000 Adams et al. .......................... 380/29
6,182,216 * 1/2001 Luyster ................................. 713/168

OTHER PUBLICATIONS

The Open Group, Common Security: CDSA and CSSM, 1997, The Open Group, Version 1, Chapter 1.*

The Open Group, Common Security: CDSA and CSSM, 1997, The Open Group, Version 1, Chapter 2.*

* cited by examiner

Primary Examiner—Thomas R. Peeso
(74) Attorney, Agent, or Firm—Oblon, Spivak, McClelland, Maier & Neustadt, P.C.

(57) ABSTRACT

A semiconductor integrated circuit for cryptographic process according to the present invention, comprises a randomizing unit for randomizing first input data which is one of two divided parts of input data based on configuration information to identify an algorithm in randomizing process, a function F portion for receiving data which have been subjected to the randomizing process and then applying coding process to the data, and an exclusive logical sum circuit for receiving second input data which is other of two divided parts of the input data and output data from the function F portion and then outputting an exclusive logical sum of the second input data and the output data.

19 Claims, 14 Drawing Sheets

SEMICONDUCTOR INTEGRATED CIRCUIT FOR CRYPTOGRAPHIC PROCESS AND ENCRYPTION ALGORITHM ALTERNATING METHOD

BACKGROUND OF THE INVENTION

1. Field of the Invention

The present invention relates to a semiconductor integrated circuit for cryptographic process and an encryption algorithm alternating method, which are capable of achieving improvement of a security protection performance of cryptography.

2. Description of the Related Art

In recent years, according to the development of communication infrastructure such as the Internet, etc., a concern for the electronic commerce which can arrange the settlement of accounts of the money on the network is caused and the cryptographic technology is needed as the important technology. Such cryptographic technology should be employed since secrecy of the contents can be ensured by coding an amount of money, approved contents, etc. in communication even in the case that an outsider intercepts the contents of the electronic commerce in the middle of communication. Nevertheless, there has been no absolutely reliable cryptographic technology at present.

FIG. 1 is a schematic block circuit diagram showing a semiconductor integrated circuit for cryptographic process in the prior art. In the semiconductor integrated circuit for cryptographic process, the same key is employed as the locking key and the unlocking key and also the transmitter and the receiver possess commonly the same key. A basic algorithm will be explained hereinbelow.

A text input which is formed as a block of 64 bit (8 byte) is divided into two right and left 4 byte (32 bit), and then one of two 4 byte is input into a function F portion 101. In this function F portion 101, randomizing process is executed by using the key data, then an exclusive logical sum of randomized data and the other of 4 byte is calculated by an exclusive logical sum (EXOR, indicated by an encircled + mark) 3, and then the exclusive logical sum is output to a succeeding function F portion 101. In this manner, the above randomizing process is repeated in unit of 4 byte by using a function F and key information. In the end, the right and left 4 byte are synthesized to obtain an 8-byte coded text. Decoding process can be executed by carrying out the above steps sequentially in reverse order.

FIG. 2 shows a DES (Data Encryption Standard) which is employed as a standard at present. This DES is employed in the function F portion 101 in FIG. 1. In FIG. 2, a unit E executes process of expanding 32 bit into 48 bit. Each of steps S1 to S8 denotes a table which converts 6 bit into 4 bit. In addition, a unit P is a processing portion which rearranges the bit order of 32 bit. In this way, in the DES, permutation of data is performed at the first round of the input portion and the final output portion.

Like the above, in the semiconductor integrated circuit for cryptographic process in the prior art, since an encryption algorithm is fixed, it is possible to decrypt the cryptography by virtue of full search of keys. In order to make the full search of keys impossible in practical use, a time consumed in the cryptographic process may be enhanced by increasing an amount of hard ware of the semiconductor integrated circuit for cryptographic process, e.g., increasing the round number in FIG. 1, etc.

However, if an amount of the hard ware of the semiconductor integrated circuit for cryptographic process is increased in order to make the decryption impossible in practical use, first there has been such a problem that an occupied area of the semiconductor integrated circuit is increased inevitably because a considerable amount of the hard ware is needed. Second, there has been another problem that it takes a lot of time to execute the process in normal use because a considerable amount of the hard ware is also needed.

SUMMARY OF THE INVENTION

The present invention has been made in light of the above circumstances and it is an object of the present invention to achieve extensive improvement of a security protection performance of cryptography.

It is another object of the present invention to execute cryptographic process at high speed.

It is still another object of the present invention to achieve reduction in a packaging area of a semiconductor integrated circuit for cryptographic process.

In order to achieve the above objects, there have been problems that, even if the security protection performance of the cryptography is improved by increasing an amount of the hard ware like the prior art, the packaging area is increased enormously and also the processing speed is reduced because of a large quantity of process. Therefore, inventors of the present invention have thought about how to solve the above problems by using any epoch-making approach.

In recent years, the inventors of the present invention have found out that, if the semiconductor integrated circuit for cryptographic process is so constructed that the encryption algorithm per se can be varied by using a reconfigurable semiconductor integrated circuit, the above problems can be solved at one breath. This is because such reconfigurable semiconductor integrated circuit is highly flexible in employment because its circuit configuration is alterable according to an external input signal. As the result of the carefully pursued study, the inventors of the present invention have been implemented the inventions set forth in the following.

As a preferred embodiment of the present invention, there is provided a semiconductor integrated circuit for cryptographic process, for executing the cryptographic process of input data based on key data, comprising:

a randomizing means for executing randomizing process of the input data based on configuration information to identify an algorithm in randomizing process.

In the above semiconductor integrated circuit, the randomizing means which can alternate the randomizing process based on the configuration information is provided. Hence, extreme improvement of the security protection performance of the cryptography and high speed cryptographic process can be achieved while reducing a packaging area.

As another preferred embodiment of the present invention, there is provided a semiconductor integrated circuit for cryptographic process, for dividing input data into a plurality of data and executing cryptographic process of input data based on key data, comprising:

a randomizing means for randomizing first input data which is one of two divided parts of the input data, based on configuration information to identify an algorithm in randomizing process;

a function F portion for receiving data which have been subjected to the randomizing process and then applying the cryptographic process to the data; and an exclusive logical sum circuit for receiving second input data which is other of two divided parts of the input data and output data from the function F portion and then outputting an exclusive logical sum of the second input data and the output data.

In the above semiconductor integrated circuit, the randomizing means may be provided in the circuit explained in the prior art and shown in FIG. 1. Therefore, the present invention can be implemented by adding the randomizing means to the semiconductor integrated circuit for cryptographic process employed in the prior art. Also, as shown in FIG.3, if several rounds of the above configuration of the present invention are provided, the security protection performance of the cryptography can be improved much more.

As still another preferred embodiment of the present invention, there is provided a semiconductor integrated circuit for cryptographic process, for dividing input data into a plurality of data and executing cryptographic process of input data based on key data, comprising:

a randomizing means for applying randomizing process to the input data based on configuration information to identify an algorithm in the randomizing process;

a function F portion for receiving data which have been subjected to the randomizing process and then applying the cryptographic process to the data;

an exclusive logical sum circuit for receiving first input data which is one of two divided parts of the input data and output data from the function F portion and then outputting an exclusive logical sum of the first input data and the output data;

a first selector for outputting second input data which is other of two divided parts of the input data and output data from the exclusive logical sum circuit selectively;

a first register for holding output data from the first selector;

a second selector for outputting the first input data which is one of two divided parts of the input data and output data from the first register selectively; and a second register for holding output data from the second selector;

whereby the cryptographic process is executed repeatedly by using the function F portion.

In the semiconductor integrated circuit, the cryptographic process is carried out by employing the above function F portion repeatedly. Since an amount of hardware can be reduced further by employing the above function F portion repeatedly, a packaging area can be reduced.

It is preferable that, since a processing time can be reduced, the randomizing means should be provided in parallel with the function F portion.

It is preferable that, since not only improvement of the security protection performance of the cryptography but also high speed cryptographic process can be achieved while reducing a packaging area, the randomizing means should be composed of a reconfigurable circuit whose circuit configuration can be varied based on the configuration information to identify an algorithm in the randomizing process.

It is preferable that, since a packaging area of the semiconductor integrated circuit can be reduced, the randomizing means should be composed of a look-up table circuit in which outputs corresponding to the input data are tabulated in advance to output corresponding data.

The randomizing means used in the preferred embodiment of the present invention, further comprises a circuit information ROM for receiving a ROM address signal as configuration information to identify the algorithm in the randomizing process and then outputting the configuration information indicated by the ROM address signal, and a reconfigurable circuit for receiving the configuration information to execute randomizing process.

Accordingly, data traffic can be reduced. As a result, a communication time can be reduced and a probability of data breakdown can be reduced.

The randomizing means used in the preferred embodiment of the present invention, further comprises, an internal timer for receiving a timer adjust signal as configuration information to identify the algorithm in the randomizing process and then synchronizing a counter with a transmitter chip, an address generator for generating an address from a counter value of the internal timer, a circuit information ROM for outputting configuration information indicated by generated address, and a reconfigurable circuit for receiving the configuration information and then executing the randomizing process.

In this semiconductor integrated circuit, the communication is carried out synchronously between the transmitter side and the receiver side by employing counter type timers on the transmitter side and the receiver side. According to the above configuration of the present invention, not only an amount of communication information can be reduced further but also it is extremely hard to obtain code-breaking information.

It is preferable that, since the security protection performance can be enhanced further, the function F portion should be composed of RFUs.

The randomizing means used in the preferred embodiment of the present invention, further comprises, a program RAM for outputting a first program, based on a RAM update signal as configuration information to identify the algorithm in the randomizing process, a program ROM for outputting a second program which has a fixed algorithm, and an MPU for executing the randomizing process by executing the first program output from the program RAM and the second program output from the program ROM.

In the above semiconductor integrated circuit, if the fixed algorithm stored in the program ROM is formed by an algorithm such as the standard DES, etc., the randomizing means is usable immediately after the power supply is turned on and also the standard cryptography is usable, so that serviceableness can be enhanced.

It is preferable that, since flexibility is lowered but an amount of transmitted data can be reduced, the program stored in the internal ROM should be read by using address information or address information designated by the counter timer.

It is preferable that, since the cryptographic process can be executed at a high speed by using a crossbar, the randomizing means should be composed of the crossbar which randomizes sequence of input bits and outputting it. Also, it is preferable that decision whether or not an involution function is obtained can be eliminated since an involution function can be obtained if the crossbar is employed.

It is preferable that, since the security protection performance can be improved, the randomizing means should execute cryptographic process based on the key data.

As still another preferred embodiment of the present invention, there is provided a method of alternating encryption algorithm between a coding chip and a decoding chip, comprising the steps of:

inputting a plaintext by the coding chip;

executing circuit configuration by the coding chip based on configuration information to identify an algorithm in randomizing process, and then executing coding process by the coding chip by using the circuit configuration;

outputting coded data generated from the coding process by the coding chip;

receiving the coded data output from the coding chip by the decoding chip;

executing the circuit configuration by the decoding chip based on the configuration information, and then executing decoding process by the decoding chip by using the circuit configuration; and outputting a decoded text by the decoding chip.

According to this method, if the randomizing process can be performed variably by using the configuration information, the encryption algorithm can be varied to thus improve the security protection performance.

DETAILED DESCRIPTION OF THE EMBODIMENTS

Figure 1:
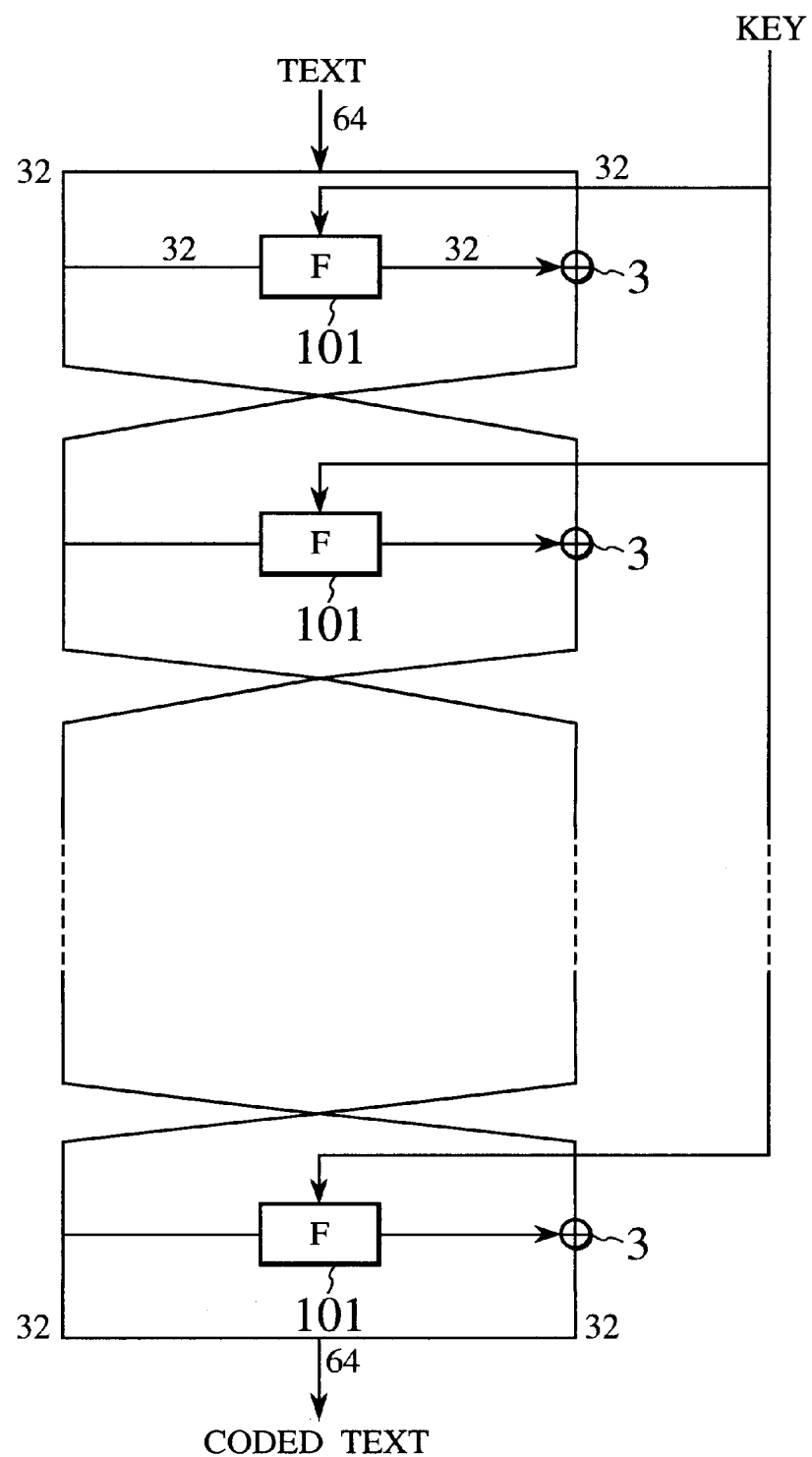
FIG. 1 is a schematic block circuit diagram showing a semiconductor integrated circuit for cryptographic process in the prior art.
Figure 2:
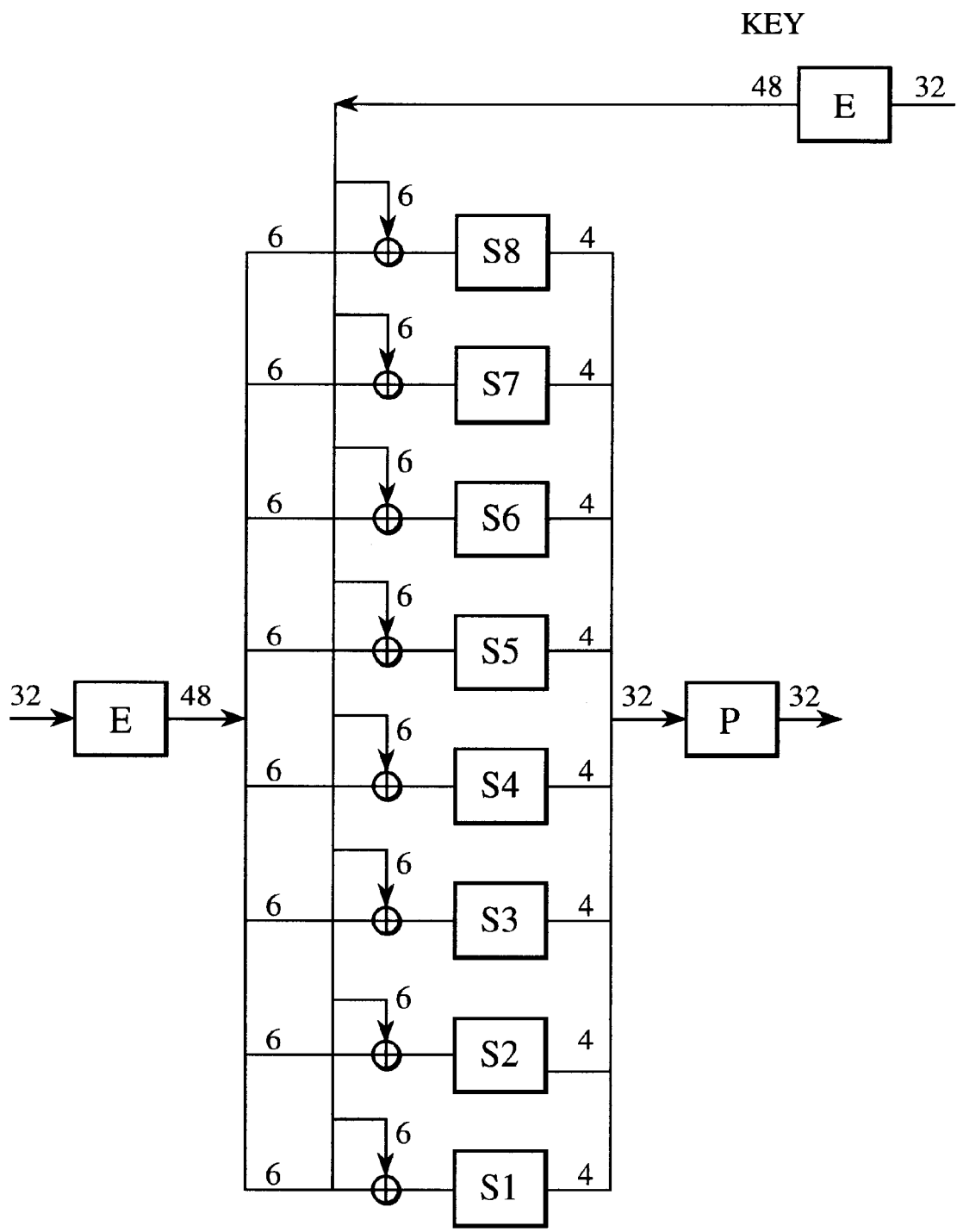
FIG. 2 is a block circuit diagram showing a function F portion of DES.

Various embodiments of the present invention will be described with reference to the accompanying drawings. It is to be noted that same or similar reference numerals are applied to the same or similar parts and elements throughout the drawings, and the description of the same or similar parts and elements will be omitted or simplified.

EMBODIMENTS OF SEMICONDUCTOR INTEGRATED CIRCUIT FOR CRYPTOGRAPHIC PROCESS

First Embodiment

Figure 3:
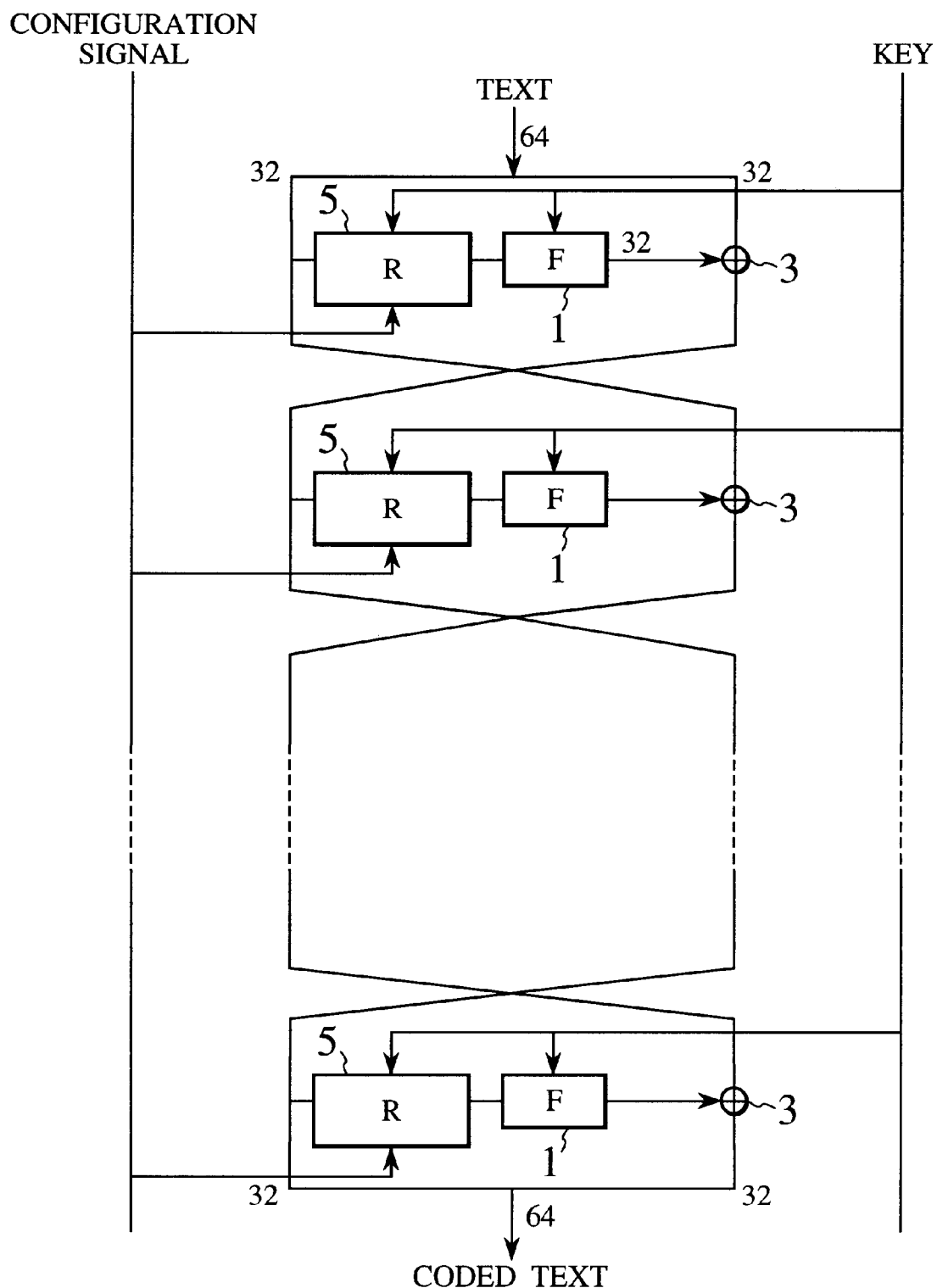
FIG. 3 is a block circuit diagram showing a semiconductor integrated circuit for cryptographic process according to a first embodiment of the present invention.

FIG. 3 is a block circuit diagram showing a semiconductor integrated circuit for cryptographic process according to a first embodiment of the present invention. This semiconductor integrated circuit for cryptographic process comprises a randomizing means 5 for receiving first input data which is one of two divided parts of input data, then alternating an encryption algorithm of the first input data based on configuration information, and then executing randomizing process of the first input data, a function F portion 1 for receiving data which have been subjected to the randomizing process and then applying cryptographic process to the data, and an exclusive logical sum circuit 3 for receiving second input data which is the other of two divided parts of the input data and output data from the function F portion and then outputting an exclusive logical sum of the second input data and the output data. In the first embodiment, several rounds of the above configuration are provided to enhance a security protection performance. One of two divided parts of input text data is input into the exclusive logical sum circuit 3 provided in the second round, and the output of the exclusive logical sum circuit 3 provided in the first round is input into the randomizing means 5 provided in the second round and the exclusive logical sum circuit 3 provided in the third round.

A feature of the first embodiment is to provide the randomizing means 5 which executes the randomizing process of the input text. The randomizing means 5 includes a variable algorithm of the randomizing process of the input signal.

The security protection performance of the cryptography can be improved by alternating an encryption algorithm since a circuit configuration in the randomizing process can be varied. Therefore, a cryptography attacker cannot cryptanalyze or interpret the cryptography unless he or she gets circuit information, i.e., algorithm information in encryption. Especially, since the circuit information depends upon an architecture of a chip, the attacker cannot cryptanalyze the cryptography unless he or she gets additionally architecture information or the chip. In this way, while keeping high speed cryptographic process and reducing a packaging area, the security protection performance of the cryptography can be improved extremely by providing the randomizing means.

Figure 4:
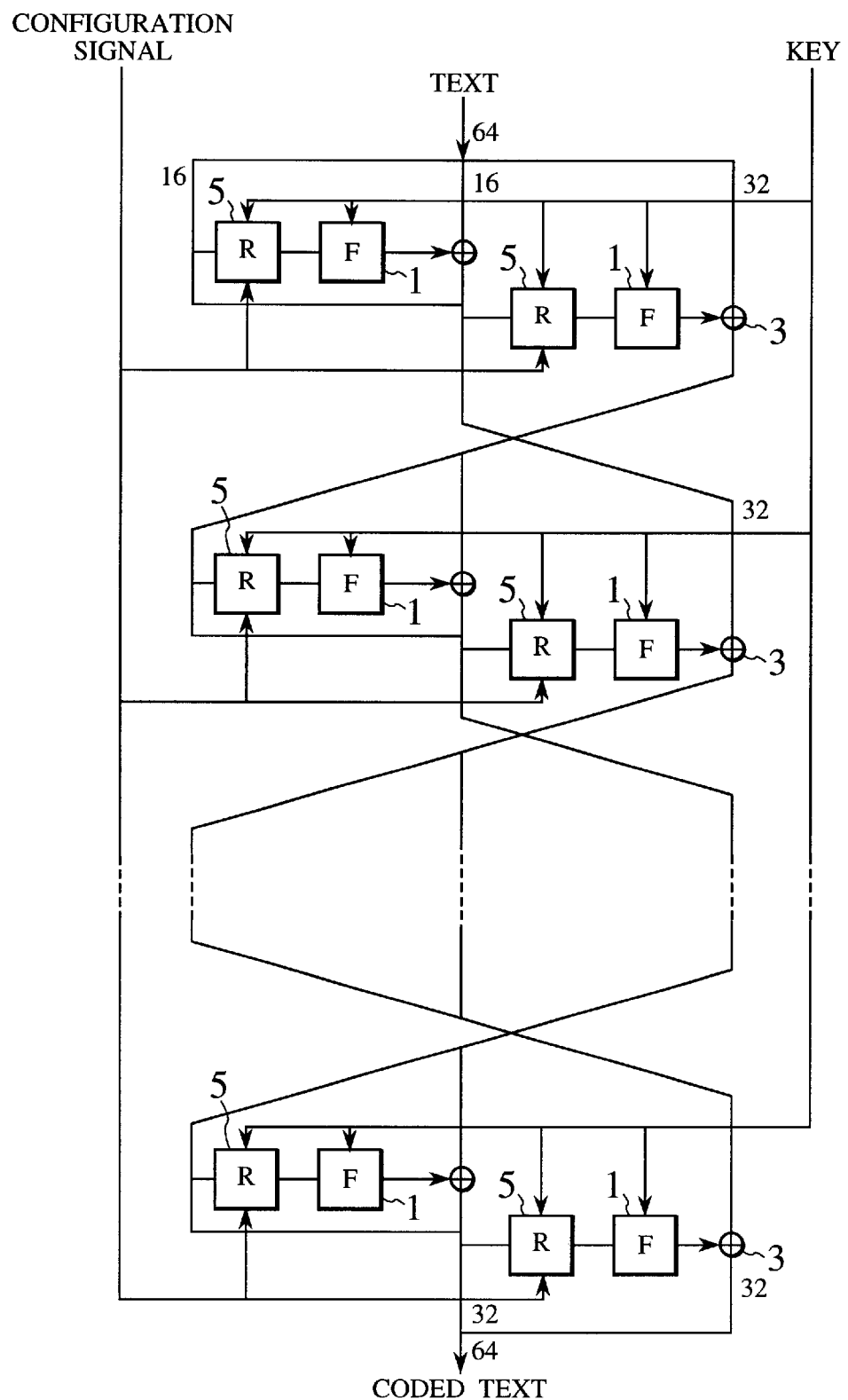
FIG. 4 is a block circuit diagram showing the case where an input text is divided into three parts in the semiconductor integrated circuit for cryptographic process according to the first embodiment of the present invention.

FIG. 4 is a block circuit diagram showing the case where an input text is divided into three parts in the semiconductor integrated circuit for cryptographic process according to the first embodiment of the present invention. In this manner, the semiconductor integrated circuit for cryptographic process can be constructed by dividing the input text into three parts or more.

Figure 5:
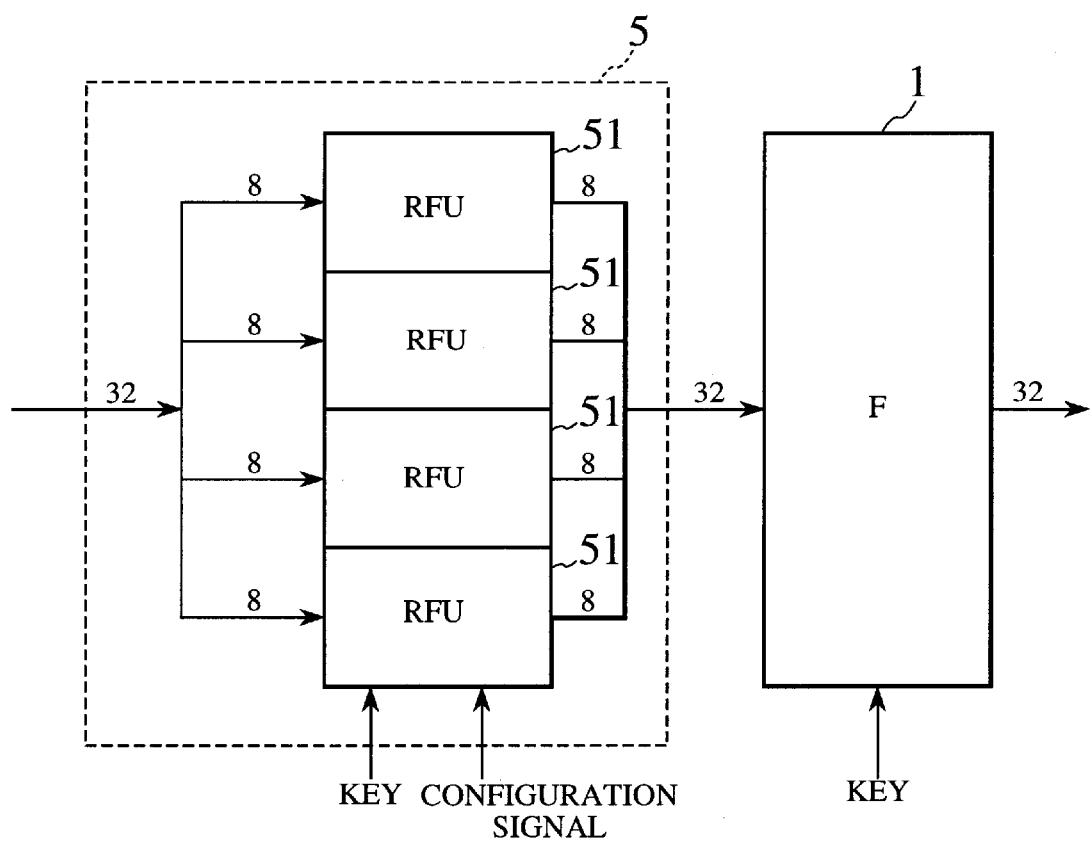
FIG. 5 is a block circuit diagram showing a first example of a randomizing means 5 in FIG. 3.

FIG. 5 is a block circuit diagram showing a first example of a randomizing means 5 in FIG. 3. The function F portion 1 is composed of a fixed function portion, and the randomizing means 5 is composed of a plurality of variable RFUs (reconfigurable function units) 51. The RFU 51 constructs the circuit based on configuration information. Four RFUs are employed in this first example. Different configuration information may be supplied to the RFUs 51 independently, otherwise same configuration information may be supplied to the RFUs 51. When 4 byte (32 bit) of data are input into the randomizing means 5, 1 byte (8 bit) of data are then input into the RFUs 51 respectively. Each of the RFUs 51 executes randomizing process of input data by using key information and then outputs randomized data to the function F portion 1. Although the RFUs 51 executes the randomizing process by use of the key information in this example, such randomizing process may be executed without the key information. This is because the encryption can be implemented only by means of the randomizing process in the RFUs 51, for the RFUs 51 can execute the randomizing process based on configuration information contained in a circuit configuration signal.

In this fashion, if the RFUs are employed as the randomizing means 5, not only the cryptographic process can be achieved at a high speed while reducing a packaging area, but also the security protection performance of the cryptography can be improved extremely. In addition, two following advantages can be attained. First, the encryption and the decryption can be processed by the same circuit in the form of the exclusive logical sum of the output of the function F portion and the data, no matter how the RFU portion is constructed. In other words, in an example described later and shown in FIG. 12, the RFU portion must be constructed by searching out functions which have at least their inverse functions. In contrast, according to this first embodiment, such an effect can be achieved that the RFU portion has a large margin of the circuit design.

Second, the cryptographic process defined by a fixed F function can be performed if the RFU is constructed as a circuit in which no bit operation is executed. For example, a fixed F function portion 1 in FIG. 5 may be formed as the F function of DES, and the RFU portion is reset at the turn-on of the power supply to thus constitute a function for processing no operation. Accordingly, this chip can operate as the DES chip at the turn-on of the power supply to execute the cryptographic process, then the encryption algorithm can be alternated by transmitting the configuration information to the chip. Advantages of this configuration are that the encryption algorithm can be determined at the turn-on of the power supply and that the configuration information, etc. can be encoded based on the encryption algorithm being determined at the turn-on of the power supply and then transmitted. In addition, this fixed function F is set to a standard encryption algorithm such as DES, a coded text which is coded by the commonly used standard approach DES can be decoded to thus increase facility of the randomizing means 5.

Figure 6:
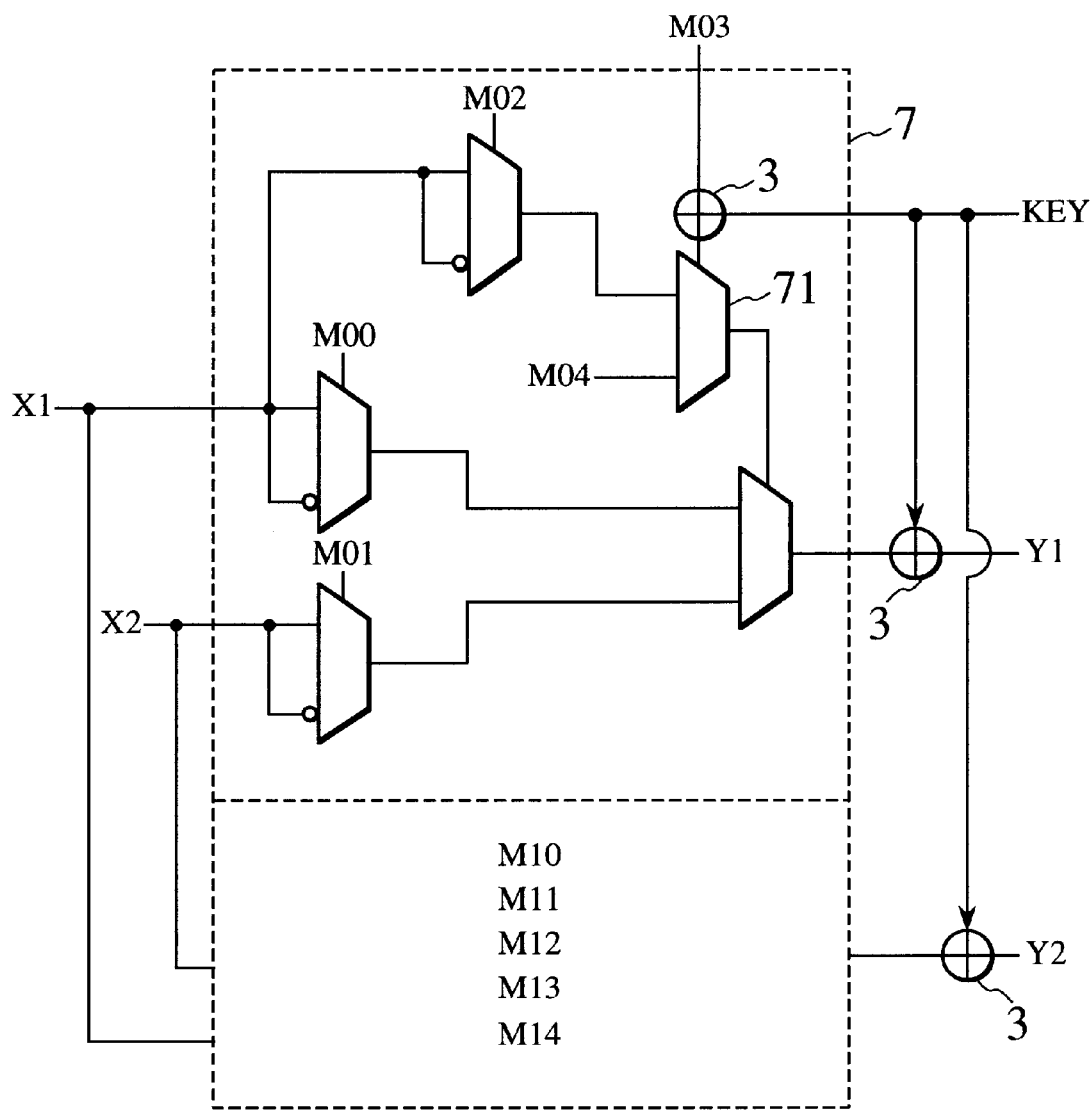
FIG. 6 is a block circuit diagram showing an example of a reconfigurable function unit (RFU)

FIG. 6 shows an example of an RFU 7. The process has been explained in unit of byte (8 bit) in FIG. 5, but an example of two-bit process is shown in FIG. 6, for simplicity of explanation. The two-input/two-output RFU 7 receives signals X1, X2, then executes predetermined process, and then outputs signals Y1, Y2. A multiplexer 71 is provided in the RFU 7 to output the data based on the configuration information M00 to M14. In case the randomizing process is performed by using the key information, the exclusive logical sum of the configuration information, the input/output signals, etc., for example, may be calculated.

Figure 7:
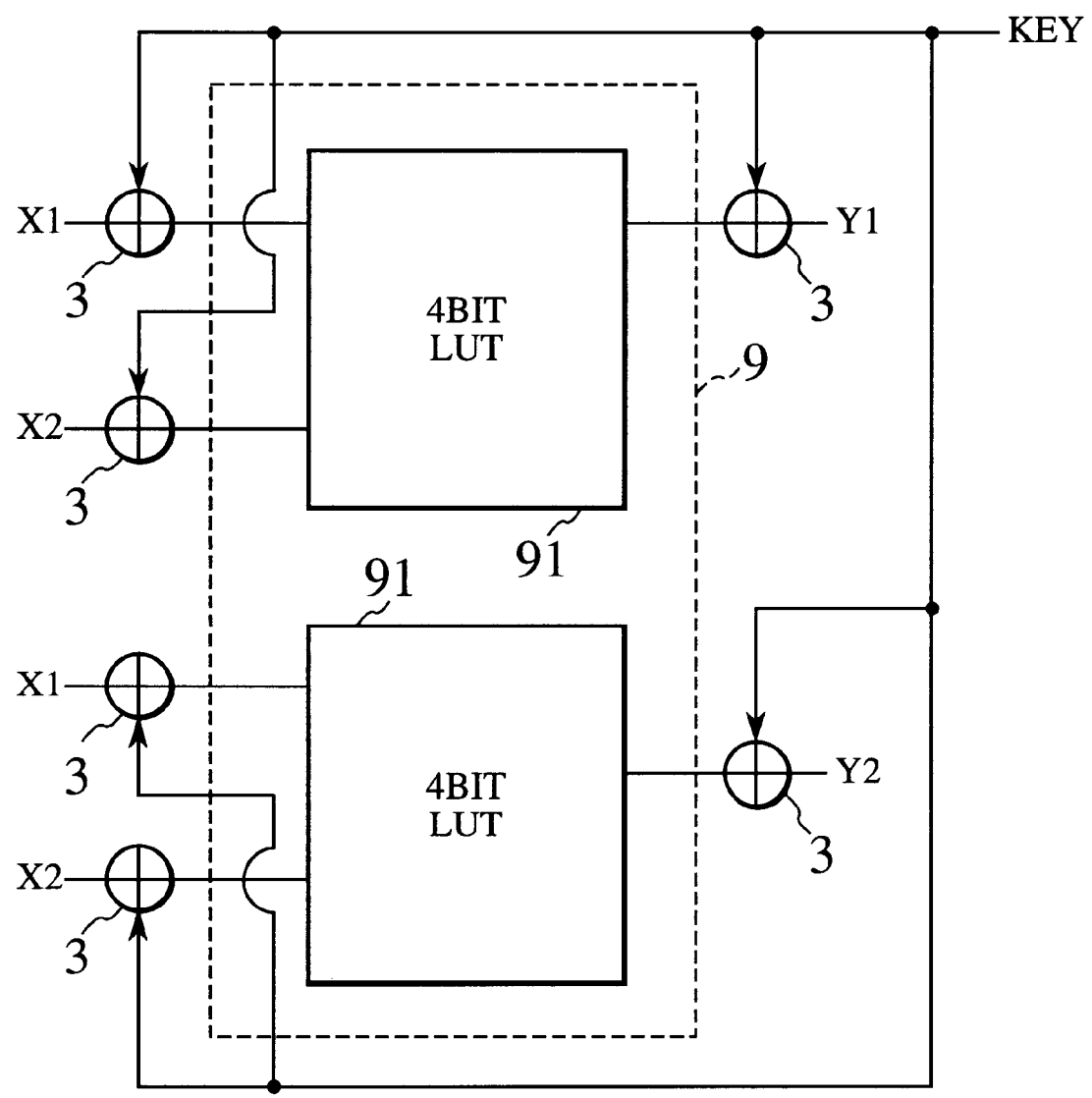
FIG. 7 is a block circuit diagram showing a second example of the randomizing means 5 in FIG. 3.

FIG. 7 is a block circuit diagram showing a second example of the randomizing means 5 in FIG. 3. In this second example, 4-bit look-up tables 91 are employed as the randomizing means 5. In this look-up table 91, outputs corresponding to the input data are tabulated in advance respectively. The look-up tables 91, when receive signals X1, X2, can output corresponding outputs as signals Y1, Y2. In the event that the randomizing process is executed by using the key information, the exclusive logical sum of the input/output signals, etc., for example, may be calculated. If the look-up tables 91 are employed, the security protection performance of the cryptography can be improved extremely while reducing the packaging area much more.

Figure 8:
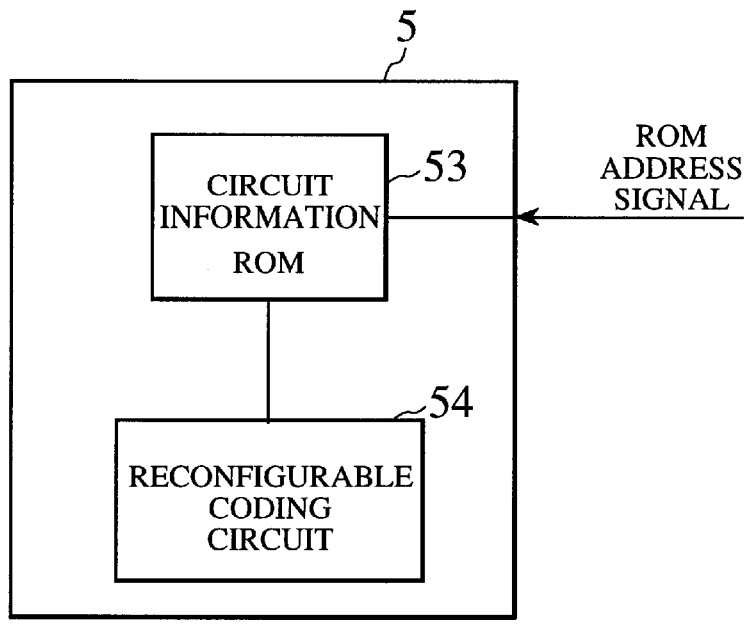
FIG. 8 is a block circuit diagram showing a third example of the randomizing means 5 in FIG. 3.

FIG. 8 is a block circuit diagram showing a third example of the randomizing means 5 in FIG. 3. In this third example, as the randomizing means 5, there are provided a circuit information ROM 53 for receiving a ROM address signal as the configuration information and then outputting the configuration information indicated by the ROM address signal, and a reconfigurable circuit 54 for receiving the configuration information to execute the randomizing process. The randomizing means 5 stores the circuit information in a memory, e.g., ROM in the chip and receives the address information from the external device.

As a result, there is no necessity of transmitting all of the configuration information, so that an amount of communication data can be reduced in the case that the configuration information are increased enormously. Consequently, a time required for the communication can be reduced and in addition a probability that the data are damaged or destroyed in the middle of transmission can be reduced.

Figure 9:
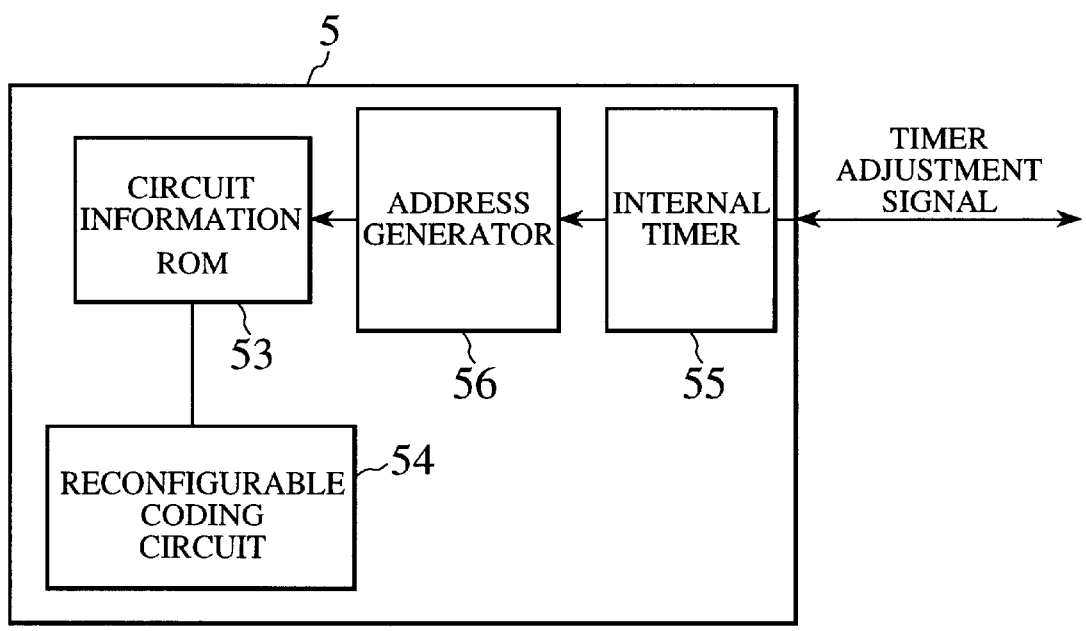
FIG. 9 is a block circuit diagram showing a fourth example of the randomizing means 5 in FIG. 3.

FIG. 9 is a block circuit diagram showing a fourth example of the randomizing means 5 in FIG. 3. The randomizing means 5 comprises an internal timer 55 for receiving a timer adjust signal as the configuration information and then synchronizing a counter with the transmitter chip side, an address generator 56 for generating an address from a counter value of the internal timer 55, a circuit information ROM 53 for outputting configuration information indicated by a generated address, and a reconfigurable circuit 54 for receiving the configuration information and then executing the randomizing process. In this fourth example, in place of the reception of the address from the outside of the randomizing means 5, the address in which the configuration information are accumulated can be generated by a counter type timer in the inside of the randomizing means 5.

Moreover, according to this fourth example, not only an amount of transmitted information can be reduced, but also it is extremely difficult to obtain code-breaking information even if the contents of the transmitted information are intercepted by the attacker in information transmission.

Figure 10:
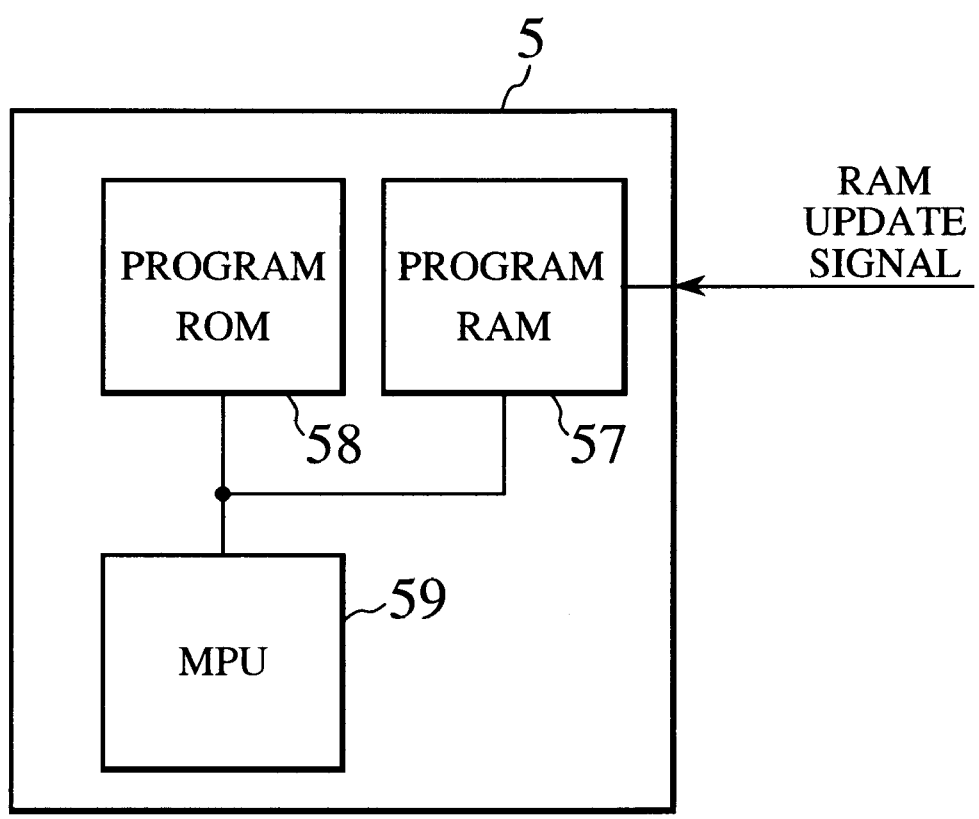
FIG. 10 is a block circuit diagram showing a fifth example of the randomizing means 5 in FIG. 3.

FIG. 10 is a block circuit diagram showing a fifth example of the randomizing means 5 in FIG. 3. In this fifth example, in a system in which the encryption algorithm is implemented by software and then processed by processors, strength of the cryptography can be increased by updating a part of the encryption algorithm.

This randomizing means 5 comprises a program RAM 57 for outputting a first program based on a RAM update signal, a program ROM 58 for outputting a second program which has a fixed algorithm, and an MPU 59 for executing the randomizing process by executing the first program output from the program RAM and the second program output from the program ROM. The update signal for the program RAM 57 is the program itself. In this case, flexibility of the randomizing means 5 can be enhanced like the example in FIG. 8, but an amount of data transmission is also increased. Hence, if the program which is stored in an internal ROM is called by using address information or address information which is designated by the counter timer, the flexibility is reduced, nevertheless an amount of data transmission can be reduced.

As described above, if the fixed algorithm is stored in the program ROM 58 and also the standard DES, etc. are employed as the algorithm, the randomizing means 5 is usable immediately after the power supply is turned on and also the standard cryptography is usable, so that serviceableness can be enhanced.

Second Embodiment

Figure 11:
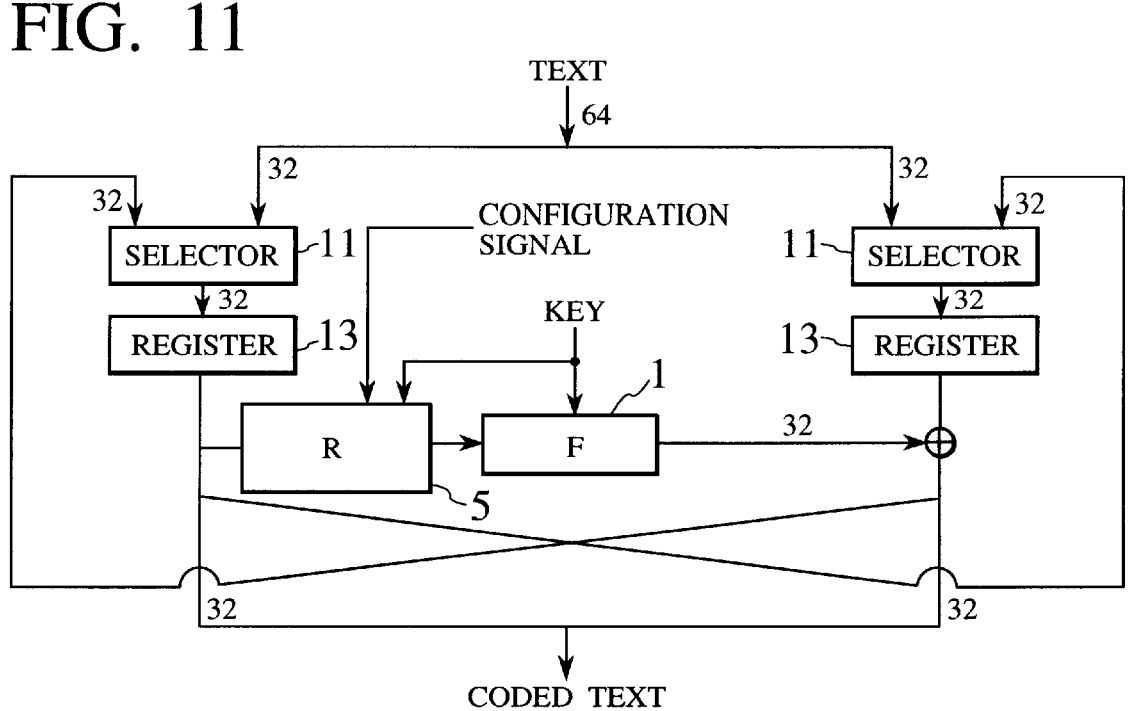
FIG. 11 is a block circuit diagram showing a semiconductor integrated circuit for cryptographic process according to a second embodiment of the present invention.

FIG. 11 is a block circuit diagram showing a semiconductor integrated circuit for cryptographic process according to a second embodiment of the present invention. This semiconductor integrated circuit for cryptographic process comprises a randomizing means 5 for receiving one of two divided part of input text data, then alternating the encryption algorithm based on the configuration information, and then applying randomizing process to one of two divided part of the input text data, a function F portion 1 for receiving data which have been subjected to the randomizing process and then applying the cryptographic process to the data, and an exclusive logical sum circuit 3 for receiving the other of two divided parts of the input text data and output data output from the function F portion 1 and then outputting an exclusive logical sum of the other of two divided parts of the input text data and the output data. Furthermore, in the second embodiment, a repetition function F is employed in order to reduce a circuit scale when the algorithm is installed into the hardware.

For this reason, there are provided selectors 11 each of which receives one of two divided parts of input data respectively and then outputs such one of two divided parts of input data and the processed data selectively, and registers 13 each of which holds the data output from the selectors 11 respectively. According to such configuration, enhancement of the security protection performance can be attained together with reduction in the amount of hardware.

Third Embodiment

Figure 12:
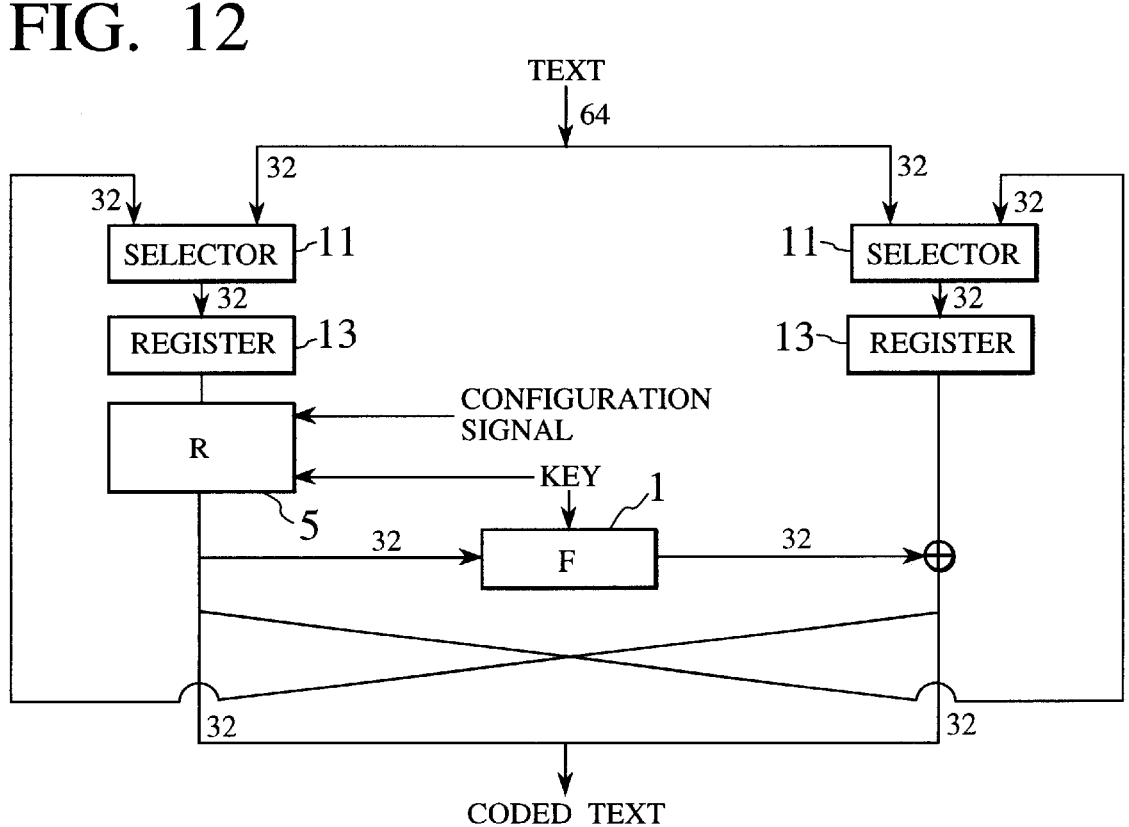
FIG. 12 is a block circuit diagram showing a semiconductor integrated circuit for cryptographic process according to a third embodiment of the present invention.

FIG. 12 is a block circuit diagram showing a semiconductor integrated circuit for cryptographic process according to a third embodiment of the present invention. Like the second embodiment, in the semiconductor integrated circuit for cryptographic process according to the third embodiment, there are provided selectors 11 each of which receives one of two divided parts of input data respectively and then outputs such one of two divided parts of input data and the processed data selectively, and registers 13 each of which holds the data output from the selectors 11 respectively. According to the above configuration, reduction in the amount of hardware as well as enhancement of the security protection performance can be attained.

A feature of the third embodiment of the present invention resides in that the RFU for randomizing the 32-bit data is directly inserted into a data path portion. Unlike the first embodiment in FIG. 3 wherein the exclusive logical sum of the output from the function F portion 1 and the half of the input data is calculated, the semiconductor integrated circuit according to the third embodiment has such an advantage that the cryptographic process is enabled depending upon the input data to thus increase the strength of the cryptography. If a function in which an inverse function called an involution function has the same type as the concerned function can be achieved in the RFU, the configuration information in FIG. 12 may be supplied to the RFU in the encryption process and the decryption process to thus enhance the serviceableness. Unless the function is the involution function, the function and the inverse function which are implemented in the RFU portion respectively must be used properly in the encryption process and the decryption process, otherwise the data path must be switched after both circuits have been constructed.

Fourth Embodiment

Figure 13:
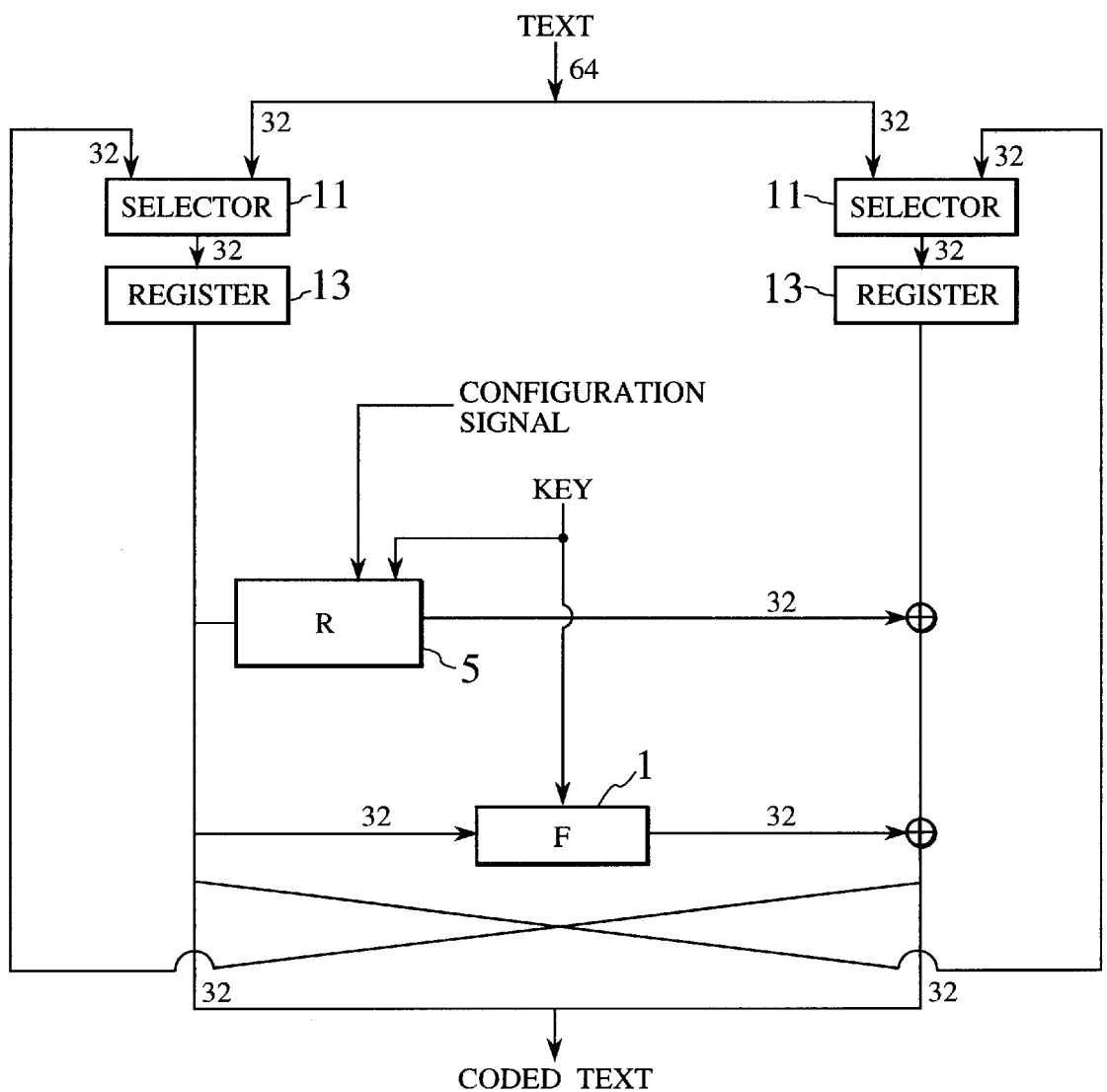
FIG. 13 is a block circuit diagram showing a semiconductor integrated circuit for cryptographic process according to a fourth embodiment of the present invention.

FIG. 13 is a block circuit diagram showing a semiconductor integrated circuit for cryptographic process according to a fourth embodiment of the present invention. In the fourth embodiment, the semiconductor integrated circuit is so constructed that the randomizing process is applied to 32 bit on the left side in FIG. 13 by the randomizing means 5 which can vary its circuit configuration based on the configuration signal, and then the output from the randomizing means 5 and 32 bit on the right side in FIG. 13 are EXORed bit by bit. Further, the function F portion 1 is provided in parallel with the randomizing means 5.

In FIGS. 11 and 12, the processing time in the reconfigurable circuit can surely contribute to a sum of the processing time in the cryptographic process. This is because the data are input into the function F portion 1 after the randomizing process of the data has been completed.

In the fourth embodiment, since the randomizing means 5 operates in parallel with the function F portion 1, the semiconductor integrated circuit is excellent in improvement of the processing speed. Also, the semiconductor integrated circuit according to the fourth embodiment has also such a feature that the inverse function exists because the format by which respective bits are EXORed is employed and the inverse function is the function itself.

Fifth Embodiment

Figure 14:
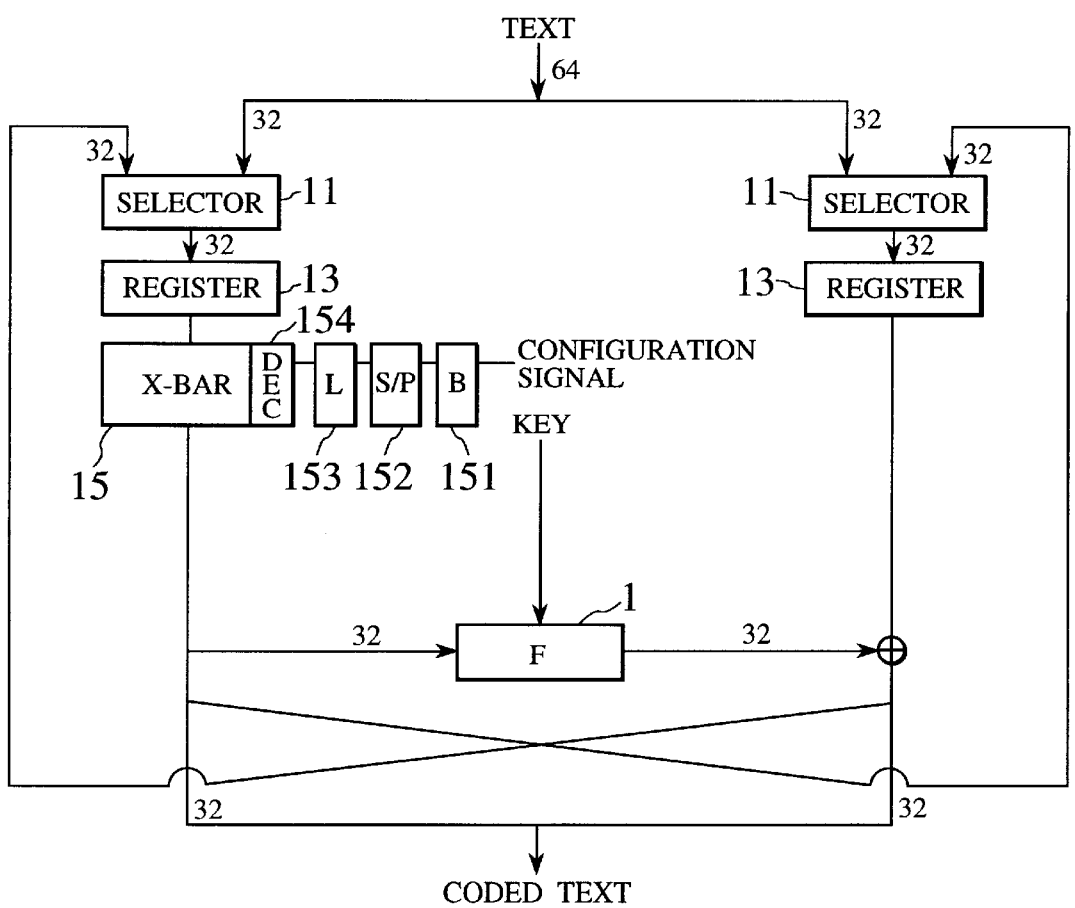
FIG. 14 is a block circuit diagram showing a semiconductor integrated circuit for cryptographic process according to a fifth embodiment of the present invention.

FIG. 14 is a block circuit diagram showing a semiconductor integrated circuit for cryptographic process according to a fifth embodiment of the present invention. The semiconductor integrated circuit for cryptographic process is equipped with a crossbar 15 as the randomizing means in FIG. 12. The crossbar 15 used in the fifth embodiment can randomize the sequence of input 32 bits and then output a 32-bit output in response to a 32-bit input. For example, the crossbar 15 can output the first input bit as the fifth output bit, the second input bit as the eighteenth output bit, and forth. This randomization can be conducted by inputting the configuration information. The configuration information, when being input, are held temporarily by a buffer 151, then a serial format of the configuration information is converted into a parallel format by a serial/parallel (S/P) converter 153, and then the configuration information are output to a decoder portion (DEC) 154 of the crossbar 15 at a predetermined timing which is decided in synchronous with an operation of a latch portion 155.

According to the fifth embodiment, the cryptographic process can be carried out at a high speed by employing the crossbar. In addition, the fifth embodiment has an advantage that, since the above involution function can be obtained by employing the crossbar like this fifth embodiment, there is no necessity of deciding whether or not the above involution function can be formed.

Sixth Embodiment

Figure 15:
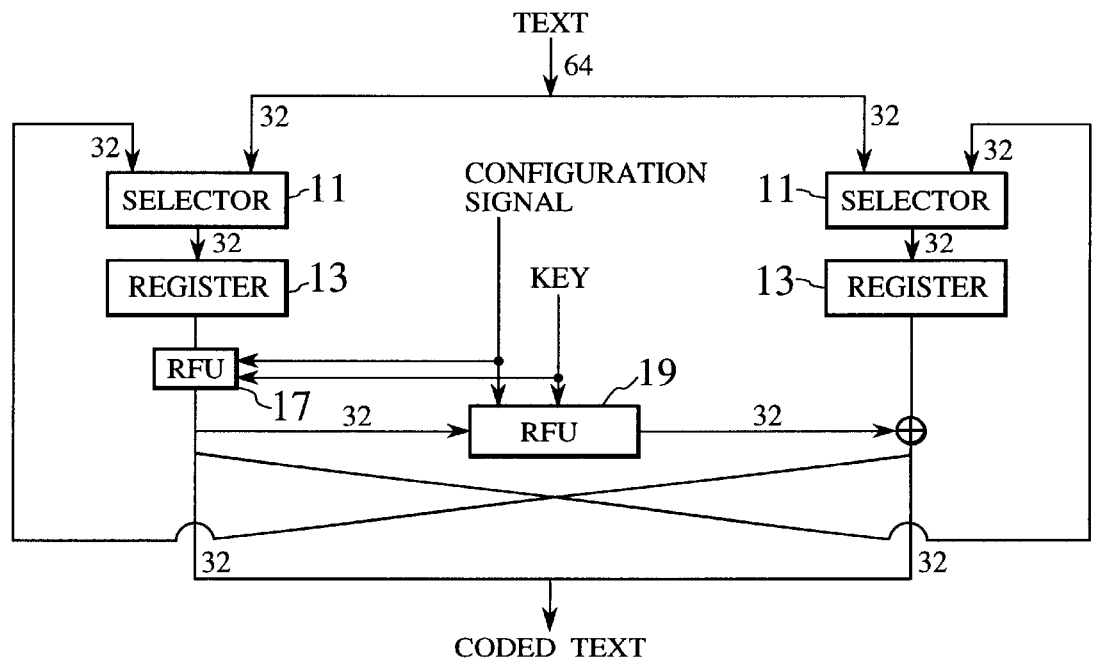
FIG. 15 is a block circuit diagram showing a semiconductor integrated circuit for cryptographic process according to a sixth embodiment of the present invention.

FIG. 15 is a block circuit diagram showing a semiconductor integrated circuit for cryptographic process according to a sixth embodiment of the present invention. In this semiconductor integrated circuit for cryptographic process, an RFU 17 is employed as the randomizing means and also an RFU 19 is employed as the function F portion. Therefore, the semiconductor integrated circuit can be constructed more flexibly. As a result, the security protection performance can be enhanced because a margin of the circuit design can be increased. Moreover, if a memory employed in the circuit can be designed to have a proper value at the time of reset, the stationary encryption at the power-on of the power supply can be implemented.

EMBODIMENT OF ALGORITHM ALTERNATING METHOD

Figure 16:
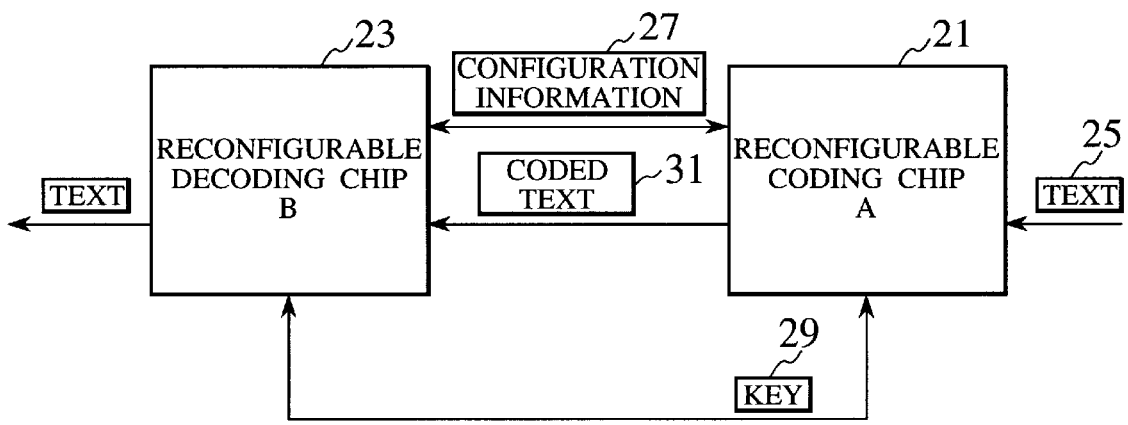
FIG. 16 is a view showing an encryption algorithm alternating method according to a seventh embodiment of the present invention.

FIG. 16 is a view showing an encryption algorithm alternating method according to a seventh embodiment of the present invention. In the seventh embodiment, the encryption algorithm is applied to the communication between a reconfigurable coding chip A21 and a reconfigurable decoding chip B23. To begin with, a plaintext which is not subjected to the cryptographic process is input into the reconfigurable coding chip A21. Then, the reconfigurable coding chip A21 executes the cryptographic process of the plaintext based on configuration information 27 and a key 29. In this case, the configuration information 27 and the key 29 may be prepared on the transmitter side, i.e., prepared by the reconfigurable coding chip A21 previously. Alternatively, the configuration information 27 and the key 29 may be designated from the receiver side, i.e., designated by the reconfigurable decoding chip B23 before the cryptographic process. In the former case, a coded text 31 is transmitted to the reconfigurable decoding chip B23. Also, the configuration information 27 and the key 29 are transmitted simultaneously.

In the latter case, the reconfigurable coding chip A21 first receives the configuration information 27 and the key 29 from the reconfigurable decoding chip B23, and then commences the cryptographic process of the plaintext.

According to this method, since the randomizing process can be executed variably by using the configuration information, the encryption algorithm can be alternated to thus improve the security protection performance. Further, because all the configuration information are input from the external device, the margin of the circuit design can be enhanced. Nevertheless, because of massive configuration information, there is drawbacks that it takes a lot of time to transmit the data and that a probability of data breakdown in transmission is increased. In this event, data traffic can be reduced by employing the approach explained with reference to FIGS. 8 and 9.

Figure 17:
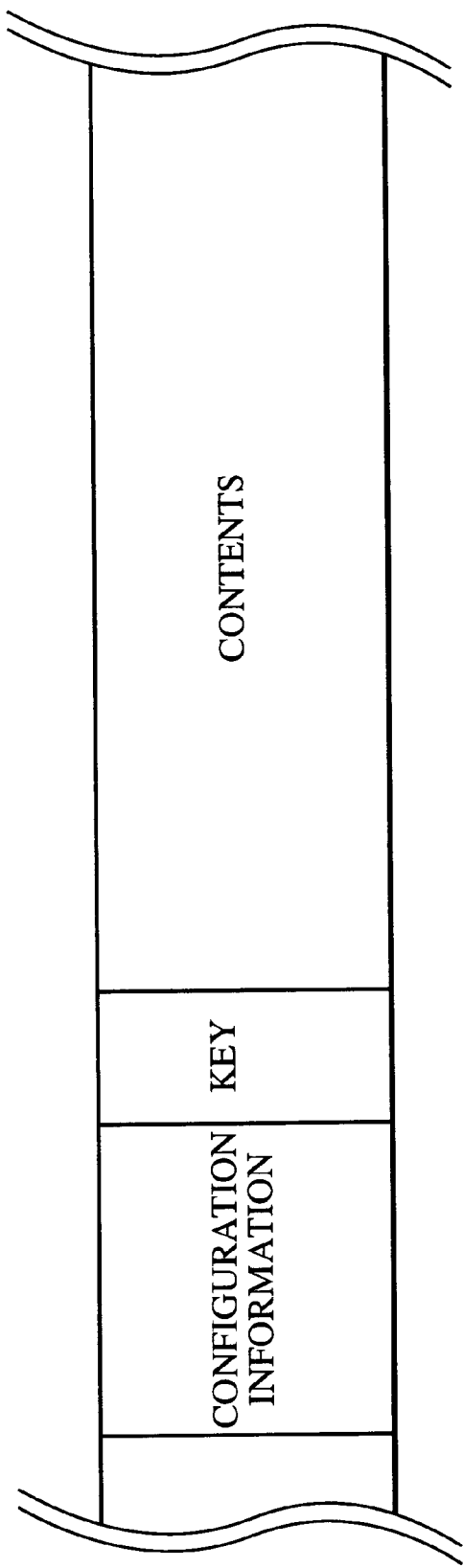
FIG. 17 is a view showing an example wherein the present invention is applied to recording media into which configuration information, etc. are stored.

FIG. 17 is a view showing the case where the present invention is applied to recording media in place of the data communication. For example, in the event that the cryptographic process is applied to the contents of a movie, the contents can be transmitted after the configuration information and the key information are inserted into a part of the contents. In this case, a decoder provided on the receiver side first extracts the configuration information and the key information from the transmitted contents, and then executes decoding process of the transmitted contents. In this manner, the encryption and the decryption can be carried out while storing RFU information in a part of the recording media. In the case of the circuit configuration shown in FIG. 10, an alternating algorithm may be stored in a part of the recording media.

The invention may be embodied in other specific forms without departing from the spirit or essential performances thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

What is claimed is:

1. A semiconductor integrated circuit for cryptographic process, for dividing input data into a plurality of data and executing cryptographic process of input data based on key data, comprising:
   a randomizing circuit configured to randomize first input data which is one of two divided parts of the input data, based on configuration information to identify an algorithm in randomizing process;
   a function F portion configured to receive data which have been subjected to the randomizing process and then apply the cryptographic process to the data; and
   an exclusive logical sum circuit configured to receive second input data which is other of two divided parts of the input data and output data from the function F portion and then output an exclusive logical sum of the second input data and the output data.

2. The semiconductor integrated circuit as claimed in claim 1, wherein the randomizing circuit is provided in parallel with the function F portion.

3. The semiconductor integrated circuit as claimed in claim 1, wherein the randomizing circuit is composed of a reconfigurable circuit whose circuit configuration can be varied based on configuration information to identify an algorithm in the randomizing process.

4. The semiconductor integrated circuit as claimed in claim 1, wherein the randomizing circuit is composed of a look-up table circuit in which outputs corresponding to the input data are tabulated in advance to output corresponding data.

5. The semiconductor integrated circuit as claimed in claim 1, wherein the randomizing circuit comprises,
   a circuit information ROM configured to receive a ROM address signal as configuration information to identify the algorithm in the randomizing process and then output the configuration information indicated by the ROM address signal, and
   a reconfigurable circuit configured to receive the configuration information to execute randomizing process.

6. The semiconductor integrated circuit as claimed in claim 1, wherein the randomizing circuit further comprises,
   an internal timer configured to receive a timer adjust signal as configuration information to identify the algorithm in the randomizing process and then synchronize a counter with a transmitter chip,
   an address generator configured to generate an address from a counter value of the internal timer,
   a circuit information ROM configured to output configuration information indicated by generated address, and
   a reconfigurable circuit configured to receive the configuration information and then execute the randomizing process.

7. The semiconductor integrated circuit as claimed in claim 1, wherein the function F portion is composed of RFUs.

8. The semiconductor integrated circuit as claimed in claim 1, wherein the randomizing circuit further comprises,
   a program RAM configured to output a first program, based on a RAM update signal as configuration information to identify the algorithm in the randomizing process, a program ROM configured to output a second program which has a fixed algorithm, and an MPU configured to execute the randomizing process by executing the first program and the second program.

9. The semiconductor integrated circuit as claimed in claim 1, wherein the randomizing circuit is composed of a crossbar for randomizing sequence of input bits and outputting it.

10. The semiconductor integrated circuit as claimed in claim 1, wherein the randomizing circuit executes cryptographic process based on the key data.

11. A semiconductor integrated circuit for cryptographic process, for dividing input data into a plurality of data and executing cryptographic process of input data based on key data, comprising:

a randomizing circuit configured to apply randomizing process to the input data, based on configuration information to identify an algorithm in the randomizing process;

a function F portion configured to receive data which have been subjected to the randomizing process then apply the cryptographic process to the data;

an exclusive logical sum circuit configured to receive first input data which is one of two divided parts of the input data and output data from the function F portion and then output an exclusive logical sum of the first input data and output data;

a first selector configured to output second input data which is other of two divided parts of the input data and output data from the exclusive logical sum circuit selectively;

a first register configured to hold output data from the first selector;

a second selector configured to output the first input data which is one of two divided parts of the input data and output data from the first register selectively; and a second register configured to hold output data from the second selector;

whereby the cryptographic process is executed repeatedly by using the function F portion.

12. A semiconductor integrated circuit for cryptographic process, for executing the cryptographic process of input data based on key data, comprising:

a randomizing circuit configured to execute randomizing process of the input data based on configuration information to identify an algorithm in randomizing process, wherein the randomizing circuit comprises, a circuit information ROM configured to receive a ROM address signal as configuration information to identify the algorithm in the randomizing process and then output the configuration information indicated by the ROM address signal, and a reconfigurable circuit configured to receive the configuration information to execute randomizing process.

13. The semiconductor integrated circuit as claimed in claim 12, wherein the randomizing circuit is composed of a reconfigurable circuit whose circuit configuration can be varied based on configuration information to identify an algorithm in the randomizing process.

14. The semiconductor integrated circuit as claimed in claim 12, wherein the randomizing circuit is composed of a look-up table circuit in which outputs corresponding to the input data are tabulated in advance to output corresponding data.

15. The semiconductor integrated circuit as claimed in claim 12, wherein the randomizing circuit executes cryptographic process based on the key data.

16. A semiconductor integrated circuit for cryptographic process, for executing the cryptographic process of input data based on key data, comprising:

a randomizing circuit configured to execute randomizing process of the input data based on configuration information to identify an algorithm in randomizing process, wherein the randomizing circuit comprises, an internal timer configured to receive a timer adjust signal as configuration information to identify the algorithm in the randomizing process and then synchronize a counter with a transmitter chip, an address generator configured to generate an address from a counter value of the internal timer, a circuit information ROM configured to output configuration information indicated by generated address, and a reconfigurable circuit configured to receive the configuration information and then execute the randomizing process.

17. The semiconductor integrated circuit as claimed in claim 16, wherein the randomizing circuit is composed of a reconfigurable circuit whose circuit configuration can be varied based on configuration information to identify an algorithm in the randomizing process.

18. The semiconductor integrated circuit as claimed in claim 16, wherein the randomizing circuit is composed of a look-up table circuit in which outputs corresponding to the input data are tabulated in advance to output corresponding data.

19. The semiconductor integrated circuit as claimed in claim 16, wherein the randomizing circuit executes cryptographic process based on the key data.

* * * * *